US 8,164,520 B2

(12) United States Patent
Raeder et al.

(10) Patent No.: US 8,164,520 B2
(45) Date of Patent: Apr. 24, 2012

(54) MASTER ANTENNA CONTROLLER

(75) Inventors: Holger Raeder, Allen, TX (US); Philip Sorrells, Corinth, TX (US); Bobby Webb, Allen, TX (US); Paul Lentz, Richardson, TX (US); Matthew D. Ferris, Plano, TX (US); Evan Nguyen, Allen, TX (US)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 12/905,733

(22) Filed: Oct. 15, 2010

(65) Prior Publication Data

US 2011/0090118 A1  Apr. 21, 2011

Related U.S. Application Data

(60) Provisional application No. 61/252,082, filed on Oct. 15, 2009.

(51) Int. Cl.
*H01Q 3/00* (2006.01)
(52) U.S. Cl. ....................................... 342/359
(58) Field of Classification Search .................... 342/359
See application file for complete search history.

(56) References Cited

U.S. PATENT DOCUMENTS

| | | | |
|---|---|---|---|
| 2006/0066494 A1* | 3/2006 | Trejtnar et al. | 343/757 |
| 2006/0229048 A1* | 10/2006 | Carroll et al. | 455/268 |
| 2007/0229378 A1* | 10/2007 | Clark | 343/757 |
| 2007/0290935 A1* | 12/2007 | Franzon et al. | 343/757 |
| 2008/0036670 A1* | 2/2008 | Arvidsson et al. | 343/758 |
| 2008/0291116 A1 | 11/2008 | Le et al. | |
| 2009/0061941 A1* | 3/2009 | Clark | 455/562.1 |
| 2009/0197634 A1 | 8/2009 | Sun et al. | |
| 2010/0201591 A1* | 8/2010 | Girard et al. | 343/766 |
| 2010/0231450 A1* | 9/2010 | Le Sage | 342/359 |

OTHER PUBLICATIONS

Wikipedia, "Touchscreen", revision dated Oct. 13, 2008.*
International Search Report and Written Opinion regarding PCT/US2010/052926.

* cited by examiner

*Primary Examiner* — Thomas Tarcza
*Assistant Examiner* — Frank McGue
(74) *Attorney, Agent, or Firm* — Husch Blackwell LLP (57) ABSTRACT

A Master Antenna Controller is provided comprising a RET Master which may replace several devices, provide full RET control based on the AISG 1.1 and 2.0 standards, provide extensive, screen-guided, intuitive RET diagnostics functionality, and provide an alignment tool free from the problems of magnetic deviation and cumbersome differential GPS antennae. The RET diagnostics functionality may include measurements of voltage, current, and AISG protocol commands. The RET Master may also include multiple different predefined tests (e.g. test one actuator, test one RET cable, test AISG signal from TMA) and also some standard electrical tests, e.g. measuring voltage, current etc. Users will be guided on the screen about how to test and what steps to do and the software will guide the user through several steps for an easy and quick trouble-shooting process.

20 Claims, 12 Drawing Sheets

MASTER ANTENNA CONTROLLER

This patent application claims Priority from U.S. provisional Application No. 61/252,082, with a filing date of 15 Oct. 2009.

BACKGROUND

Currently many wireless operators use RET (remote electrical tilt) antennas. RET antennas allow wireless operators to remotely control the beam attributes, including, for example, beam direction, of one or more antennas.

Typically, the RET antenna beam attributes are adjusted using motors or actuators according to specifications promulgated by the Antenna Interface Standards Group (AISG). Relevant specifications may be found at http://www.aisg.org.uk (incorporated by reference). While the use of RET antennas has proved advantageous, the setup of such antennas currently requires considerable effort. In order to setup, troubleshoot, and control RET antennas, several different portable controllers may be required. For example, when trouble-shooting RET antenna configurations, crews currently depend on separate electrical measurement and troubleshooting devices which are difficult to use. Additionally crews are often overwhelmed and do not know how to trouble-shoot RET configurations.

When technician crews are on site, wireless operators require the technician crews to provide "close-out-packages" to the wireless operators as a proof of work. A close out package is a key deliverable. Especially during a new installation, preparation of a close out package involves a substantial amount of effort. Currently, technician crews must capture screenshots of controller windows (sometimes with using a camera), manually export selected data, and manually measure and record the location of the antenna with a GPS receiver. Often, the disparate sources of information are manually collected and written to a CD ROM or DVD ROM. Photographs of display screens may be saved in directories on the disks.

The initial azimuth direction of an antenna is often a requirement of the wireless operator, and may depend on topography and the location of physical obstructions. In one known method of alignment, a technician may aim the antenna with the aid of a magnetic compass. However, the antennas being aimed, and the structures on which they are mounted, may introduce significant magnetic deviation to the compass, which adversely affects the accuracy of the installation. In an alternative known method, technician crews depend on complex and expensive alignment devices to align each antenna so that the main beam direction points to the desired azimuth direction. In one example, an alignment tool includes two GPS antennas on arms sufficiently long so that a GPS receiver can detect the location of each arm and thereby determine an azimuth angle for the alignment tool. A disadvantage of such a tool is that arms sufficiently long to make the tool effective are also sufficiently long to make the tool cumbersome and difficult to use on a cell phone antenna tower.

SUMMARY

A Master Antenna Controller is provided herein. In one example, the Master Antenna Controller comprises a RET Master which may replace several devices, provide full RET control based on the AISG 1.1 and 2.0 standards, provide extensive, screen-guided, intuitive RET diagnostics functionality, and provide an alignment tool free from the problems of magnetic deviation and cumbersome differential GPS antennae. The RET diagnostics functionality may include measurements of voltage, current, and AISG protocol commands. The RET Master may also include multiple different predefined tests (e.g. test one actuator, test one RET cable, test AISG signal from TMA) and also some standard electrical tests, e.g. measuring voltage, current etc. Users will be guided on the screen about how to test and what steps to do and the software will guide the user through several steps for an easy and quick trouble-shooting process.

The RET Master may include a Close-Out-Package Wizard, which will allow technician crews to create standardized close out packages with a few clicks. The Close-Out Package Wizard significantly reduces the time required of the technicians to prepare the close out packages. Also, the wizard provides a standardized close out package format to ensure that the same format is used by all technician crews.

The RET Master may be hand-held and battery powered which will allow using that unit on a tower. The RET Master may have a touch-screen for easy handling on site. The RET Master may also have a GPS receiver for easy location measurements. These location measurements may be included in the close out packages. Also, the GPS functionality and different user locations may be employed by the RET Master to perform the functions of an alignment tool for antenna azimuth direction.

DETAILED DESCRIPTION

A RET Master 10 according to one example, is a hand held AISG-compliant controller. The RET Master 10 enables a technician to perform initial setup testing, installation configuration, and trouble shooting diagnostics of all Antenna Line Devices, Remote Electrical Tilt Devices, and Tower Mounted Amplifier. The RET Master 10 is preferably small in size and operable from a battery or a wall plug-in power supply. In one example, the RET Master 10 has a processor and supporting hardware sufficient to operate the Windows CE operating system. Other operating systems suitable for handheld or portable devices may also be used. The RET Master 10 includes enough non-volatile memory storage to hold the operating system footprint, antenna configuration files, AISG protocol stack, and preferably room for future growth.

Figure 1:
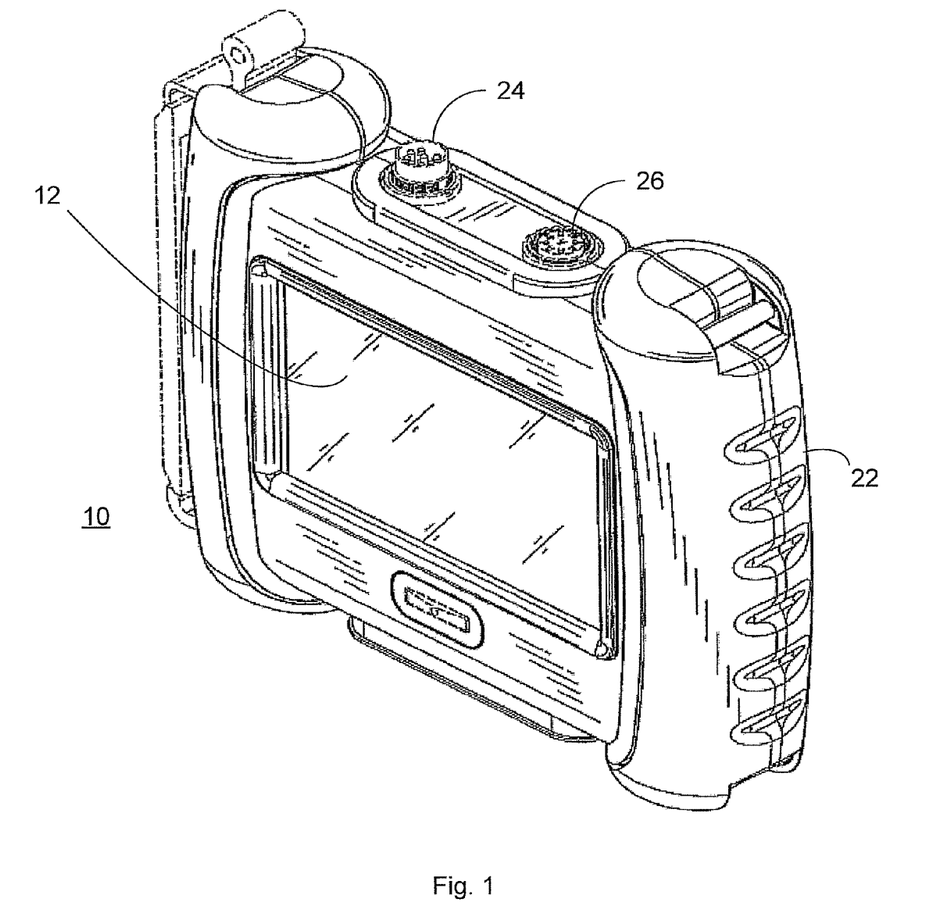
FIG. 1 is an external view of a Master Antenna Controller according to one example of the present invention.
Figure 2:
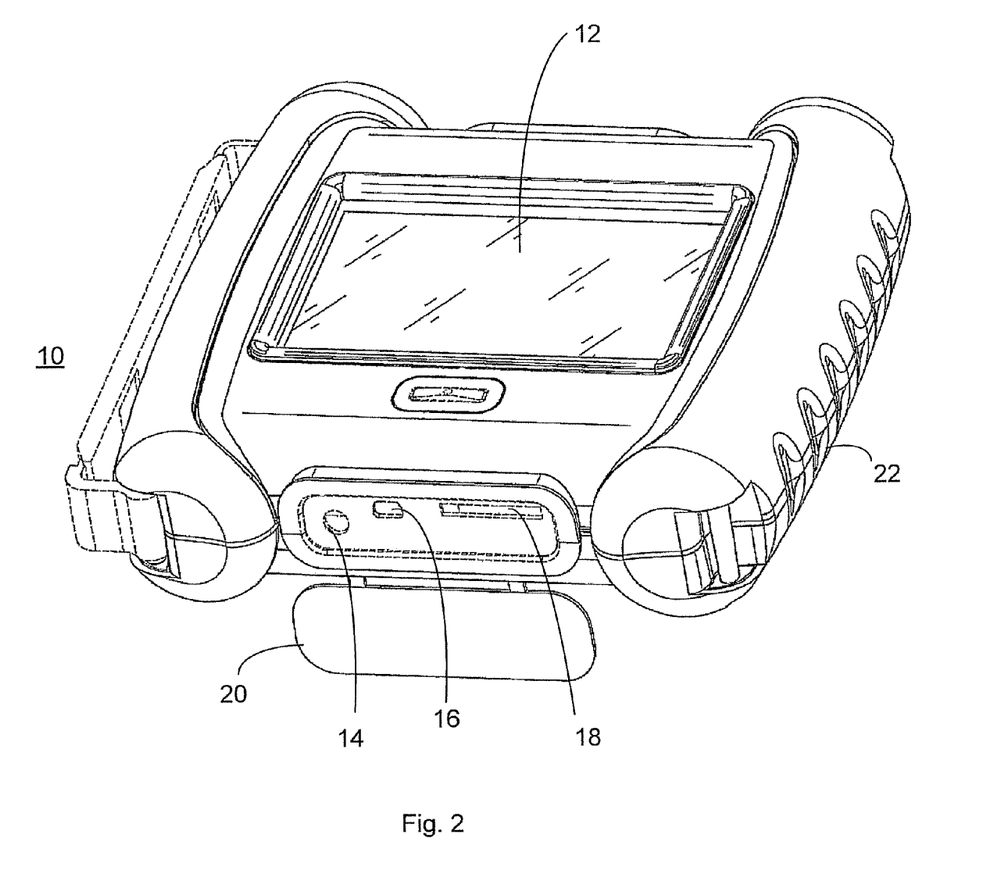
FIG. 2 is another external view of a Master Antenna Controller according to one example of the present invention.

Exterior views of one example for RET Master 10 are provided in FIGS. 1 and 2. The RET Master 10 of this example has a graphical display 12. In one example, the graphical display 12 may further comprise a touch screen for input. The RET Master has a power connector 14 for receiving DC power from an external power source, such as an A/C wall power supply and charger (not shown), a USB connector 16 and a memory card connector 18. The memory card connector may be for a Secure Digital (SD) card. The connectors may be protected by a cover 20. Grips 22 may be provided for ease of holding the RET Master 10 in use. Male AISG connector 24 and female AISG connector 26 are provided.

Figure 3:
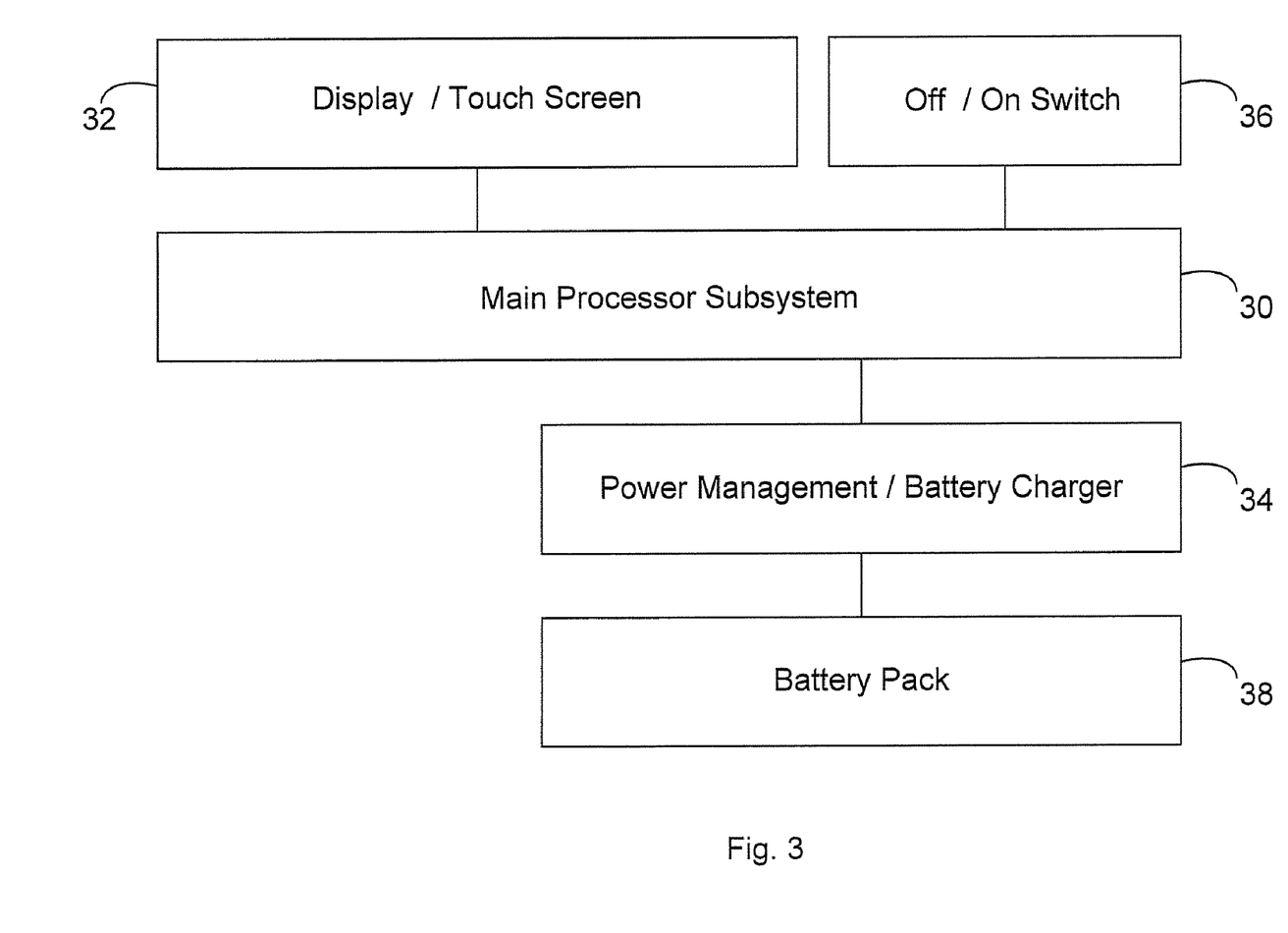
FIG. 3 is a block diagram of a Master Antenna Controller according to one example of the present invention.

A RET Master 10 may include various hardware blocks. FIG. 3 illustrates one example of how hardware may be arranged in a RET Master 10. In this example, the main processor subsystem 30 is connected to a display/touch screen subsystem 32, a power management/battery charger subsystem 34 and an on/off switch 36. The main processor subsystem 30 may be implemented on a circuit board as a complete system on a module capable of driving the graphical display 12, accepting input from the touch screen, of the graphical display 12 communicating to any AISG 1.0 and 2.0 devices and having the hardware ability to do diagnostic testing on the AISG interface. Block diagrams of examples of main processor boards are provided in FIGS. 4-7.

The power management/battery charger subsystem 34 may further be connected to a battery pack 38. Any suitable battery pack may be used. In one example, the battery pack 38 may further comprise a NiMH smart battery pack with fuel gauge, sub-system. Preferably, the battery pack will incorporate a thermal fuse and a current fuse for protection.

In an alternate embodiment, hardware blocks may include a digital camera and a GPS (Global Positioning System) receiver.

Figure 4:
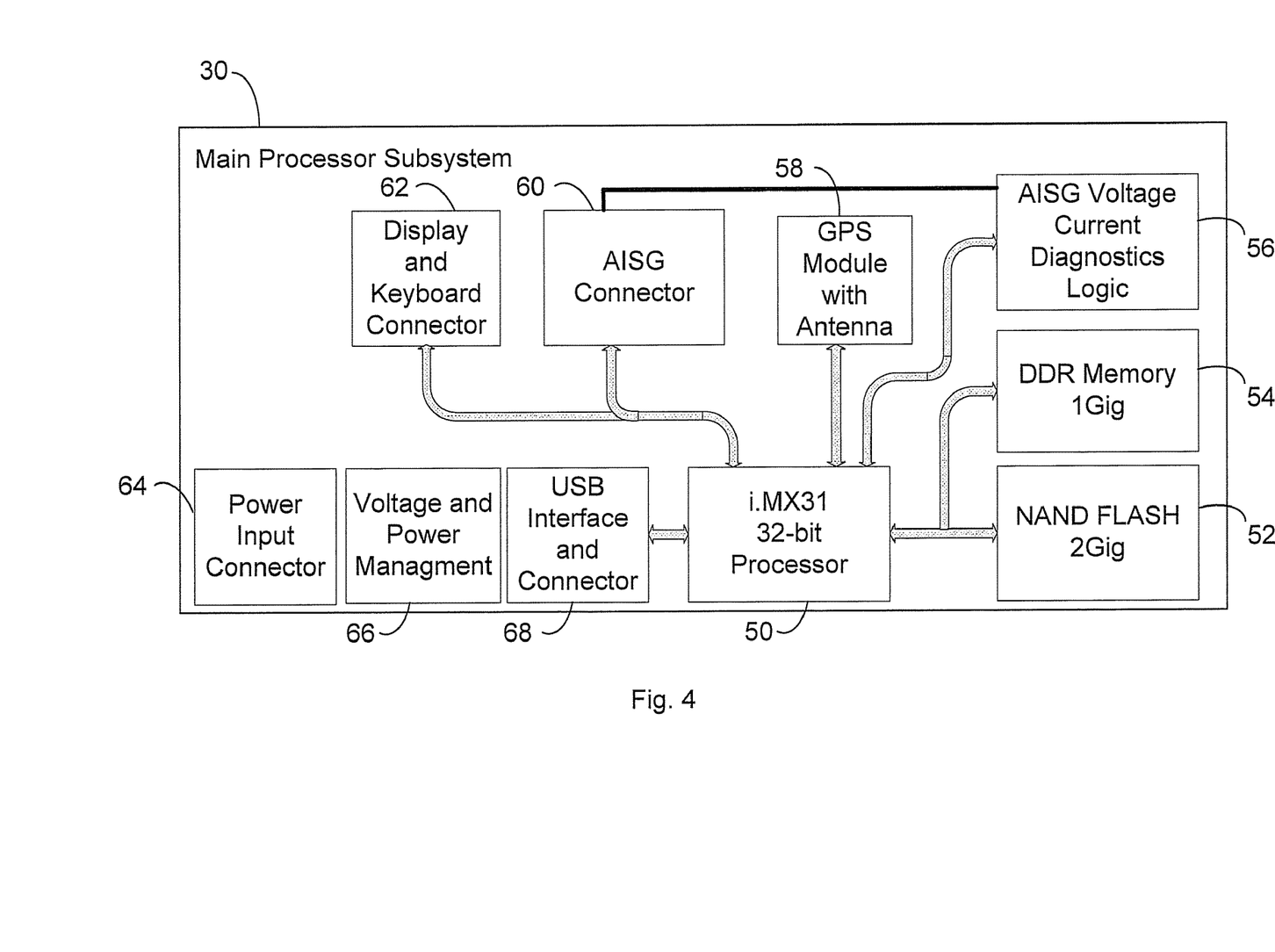
FIG. 4 is a block diagram of one example of a main processor subsystem of a Master Antenna Controller according to one example of the present invention.

One example of a main processor subsystem 30 is illustrated in FIG. 4. The main processor subsystem 30 of this example includes a processor 50, a storage memory 52, working memory 54, AISG diagnostics logic 56, GPS module 58, AISG connector 60, display and keyboard connector 62, power input connector 64, voltage and power management 66, and a USB interface and connector 68.

The processor 50 preferably includes multimedia capabilities. In one example, the processor is based around an ARM11 core and operates at about 500 MHz. In this example, the system implemented by the processor includes multimedia and floating-point hardware acceleration, a floating point co-processor, advanced power management, and security.

The storage memory 52 is coupled to the processor 50 and preferably comprises NAND Flash memory. The NAND Flash memory may include a high density 2G-bits, low power, 1.8 Volt memory. This storage memory 52 may be used to store the operating system. Additionally, the storage memory 52 may be used to store antenna configuration files and firmware upgrades for tower top RET, TMA and CAD devices. The processor 50 may acquire previously stored antenna configuration information from the storage memory 52 as may be needed.

The working memory 54 is coupled to the processor 50 and may comprise RAM memory. In one example, the main board includes 1 Gig-bit of double data rate, low power, 1.8 Volt, 133 MHz, volatile random access memory. This DDR memory is arranged in a 32 Meg×32 bits wide (8 Meg×32-bit×4 banks).

USB interface and connector 68 may comprise a Universal Serial Bus interface transceiver (PHY) that is USB 2.0 On-The-Go compliant. The connector on the board may be the Mini USB connector. The USB interface and connector 68 is coupled to the processor 50. In an alternative example, a USB interface may be integrated into the processor 50.

The main processor subsystem 30 may include GPS module 58. The GPS module 58 is coupled to the processor 50 and may be used, for example, to determine cell tower locations and assist in antenna alignment. The location information may be used for documentation proposes and to help with diagnostics documentation. In one example, a suitable GPS module 58 is a 20 Channel Global Position System receiver surface mount device. Modules which have fast acquisition times, high receiver sensitivity and low power consumption in a small, compact form factor are preferred. In one example, the RET Master 10 includes a passive antenna for GPS signal reception. Alternatively, an active antenna may be used. The Main processor subsystem 30 may include provisions for assembly with either a passive or active GPS antenna.

In one example, voltage and power management 66 may comprise an integrated power management IC for applications which require multiple power rails. The power management IC may provide three highly efficient, step-down converters targeted at providing the core voltage, peripheral, I/O, and memory voltage rails in a processor based system. In the RET Master 10 the power management IC provides 1.45V, 1.8V, and the 2.5V voltages to run the main processor subsystem 30. This power management IC manages the low power modes of the processor. The low power modes include Run, Wait, Doze, Retention state, Deep Sleep, and Hibernate modes.

AISG Connector 60 on the main processor subsystem 30. This AISG-compliant interface preferably includes two standard 8-pin, AISG Connectors, male AISG Connector 24 and female AISG Connector 26. The female AISG connector 26 may also be used to output the RS-485 interface from the hand held controller per the AISG 1.0 and 2.0 protocol and 24 volts to power a RET/TMA device. The male AISG connector 24 may be used for electrical diagnostics at the physical layer. The male AISG connector 24 interface may be used to check an AISG cable for opens, shorts, and to check to see if there is continuity on the RS-485 signal.

MSG diagnostics logic 56 is provided to help a service technician diagnose problems with any module hooked up to the AISG connector. The AISG logic 56 is coupled to the AISG connector 60 and to the processor 50. This circuitry will monitor the voltage and current (power) of the 24 volt supply from the female AISG connector 26. It will also monitor for a short circuit condition on the RS-485 interface. The RET Master 10 may also be configured to reset a RET device by turning off/on the power without needing to physically remove the connector.

The main processor subsystem includes several connectors. Display and keyboard connector 62 is coupled to the processor 50 and includes, for example, three separate connectors; one for a display, one for a touch screen, and one for a keyboard. Other provided connectors include power input connector 64 and a diagnostic port 72. The diagnostic port 72 may be used for debug purposes used by engineering. The diagnostic port 72 includes RS-232, RS-485, reset, voltages and other nets used for debugging the main processor subsystem 30. Additionally, a JTAG test connector used for software debugging may be provided. Male AISG connector 24 and a female AISG Connector 26 may also be on the main board.

The display/touch screen subsystem 32 may include any suitable graphical display 12. In one example, the graphical display 12 is approximately five inches diagonal with an 800×480 pixel resolution and has a 24-bit RGB interface. The graphical display 12 preferably comprised a touch-sensitive display.

Figure 5:
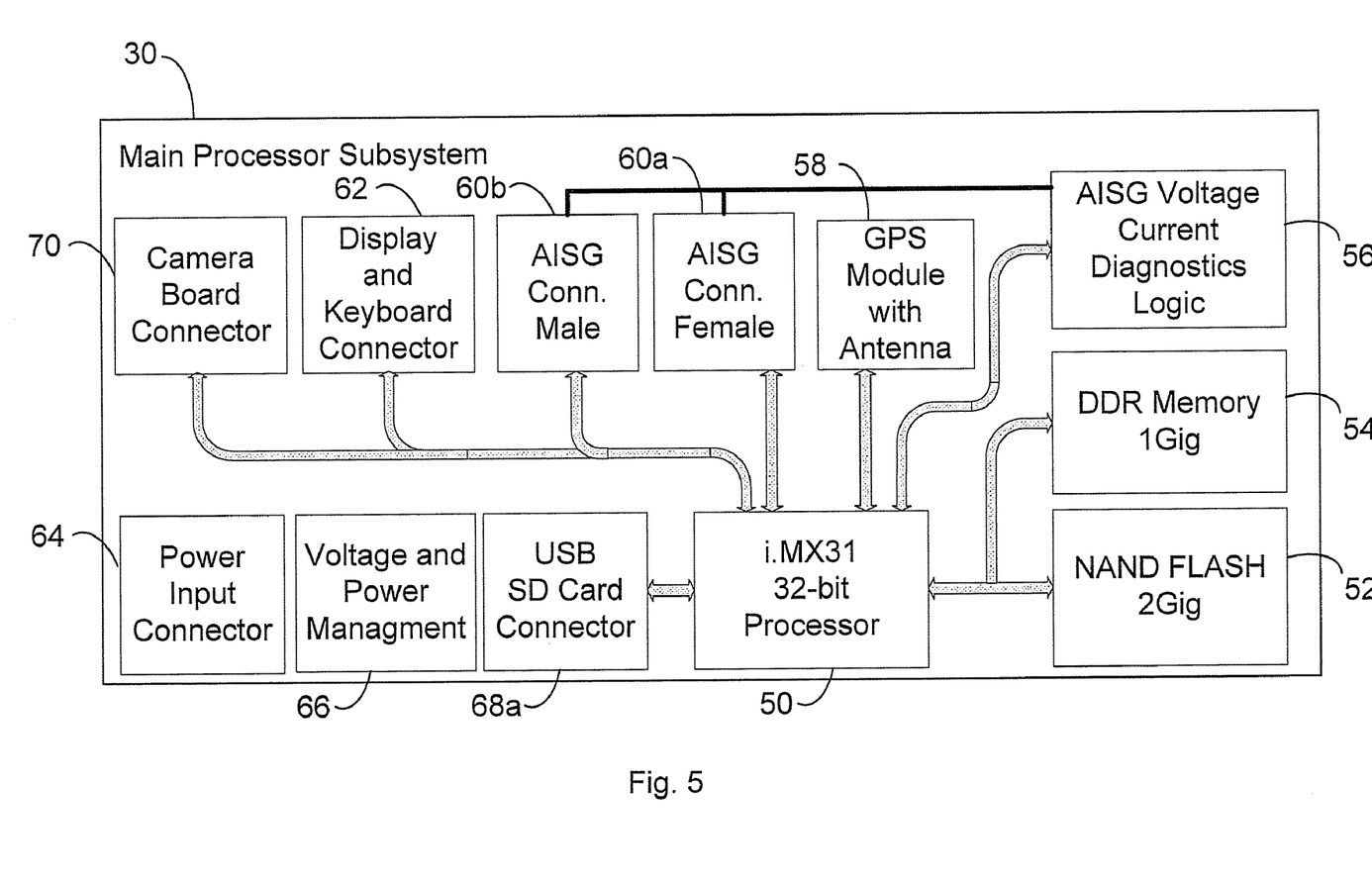
FIG. 5 is a block diagram of another example of a main processor subsystem of a Master Antenna Controller according to one example of the present invention.

In an alternate embodiment, illustrated in FIG. 5, the processor 50, storage memory 52, working memory 54, AISG diagnostics logic 56, GPS module 58, AISG Connector 60, Display and Keyboard connector 62, power input connector 64, voltage and power management 66 are largely the same as the embodiment of FIG. 4, and the descriptions of such are incorporated by reference. This alternate embodiment and a USB interface and SD card connector 68a, which combines the interface functions of the USB and memory card connectors. The USB interface and connector 68 of FIG. 4 may be modified to include memory card support. Also, the embodiment of FIG. 5 includes a camera board connector 70. An integrated camera is an optional feature of the RET Master 10.

Figure 6:
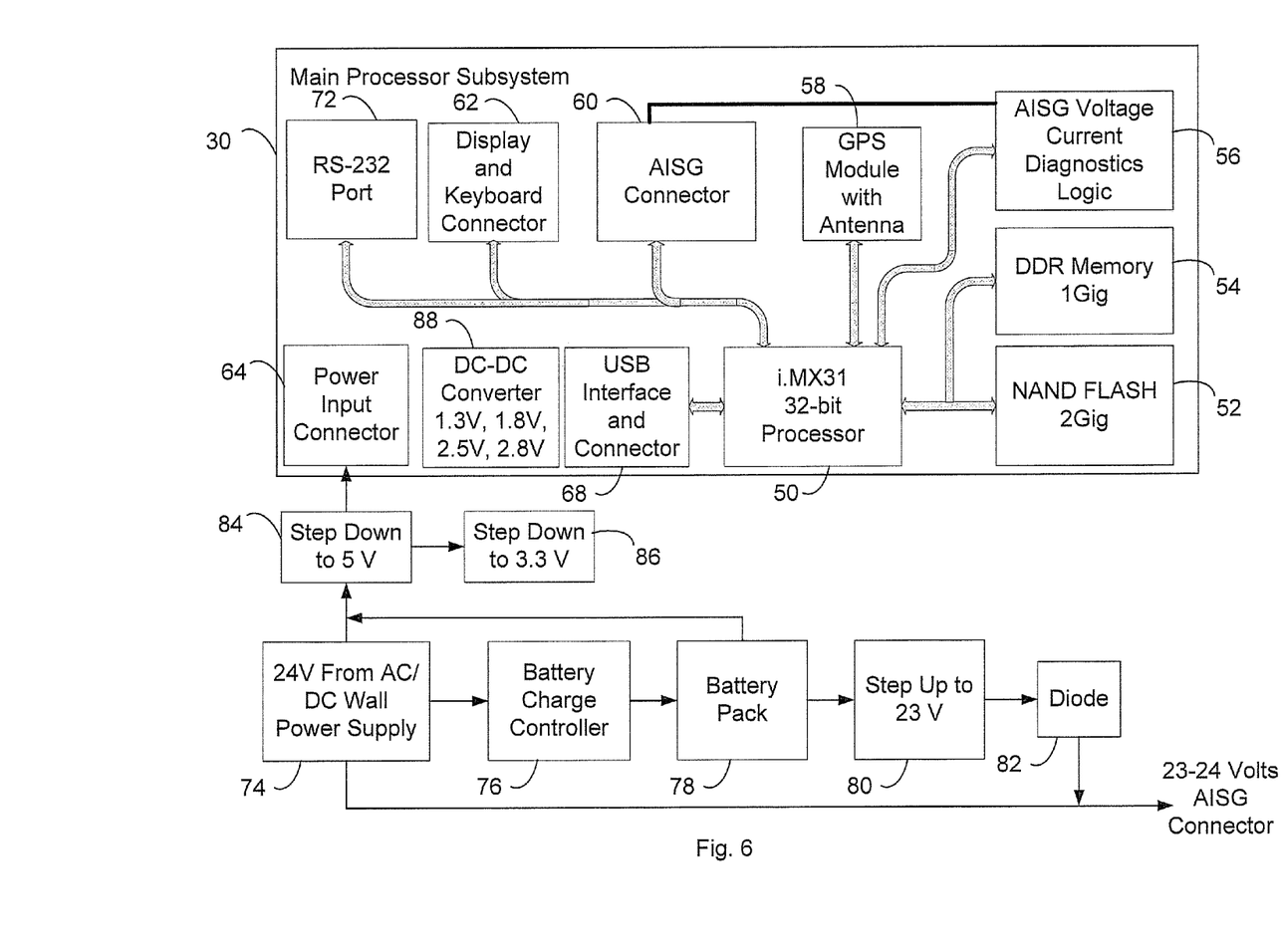
FIG. 6 is a block diagram of another example of a main processor subsystem of a Master Antenna Controller according to one example of the present invention.

Another alternate embodiment of main processor subsystem 30 is illustrated in FIG. 6. This example includes features of the power management subsystem 34. The processor 50, storage memory 52, working memory 54, AISG diagnostics logic 56, GPS module 58, AISG Connector 60, Display and Keyboard connector 62, are largely the same as the embodiment of FIG. 4, and the descriptions of such are incorporated by reference. This example further includes RS-232 port 72 for the purpose of debugging and testing. This port will go to a connector that will be used for engineering. Typically, this port would not be used by the technicians in the field. This example also illustrates additional features of power management, including a 24 Volt input from an AC to DC wall power supply 74, a battery charge controller 76 coupled to the 24VDC input from wall power supply 74, a battery pack 78, a step up converter 80, and a diode 82. The AISG interface may also be powered directly by the 24VDC input, if the RET Master 10 is plugged into the wall charger when in use. Also shown is a step down voltage converter 84 to step the voltage down from the battery voltage (or wall charger voltage) to 5 VDC. Also shown is a step down converter 86 to step down from 5 VDC to 3.3 VDC, and a DC to DC converter 88, which provides output voltages of 1.3 V, 1.8 V, 2.5 V and 2.8 V from a 5 V input.

The battery charge controller 76 may be coupled to the 24VDC input. The step up converter 80 may convert the battery voltage to voltage suitable for the AISG interface.

Figure 7:
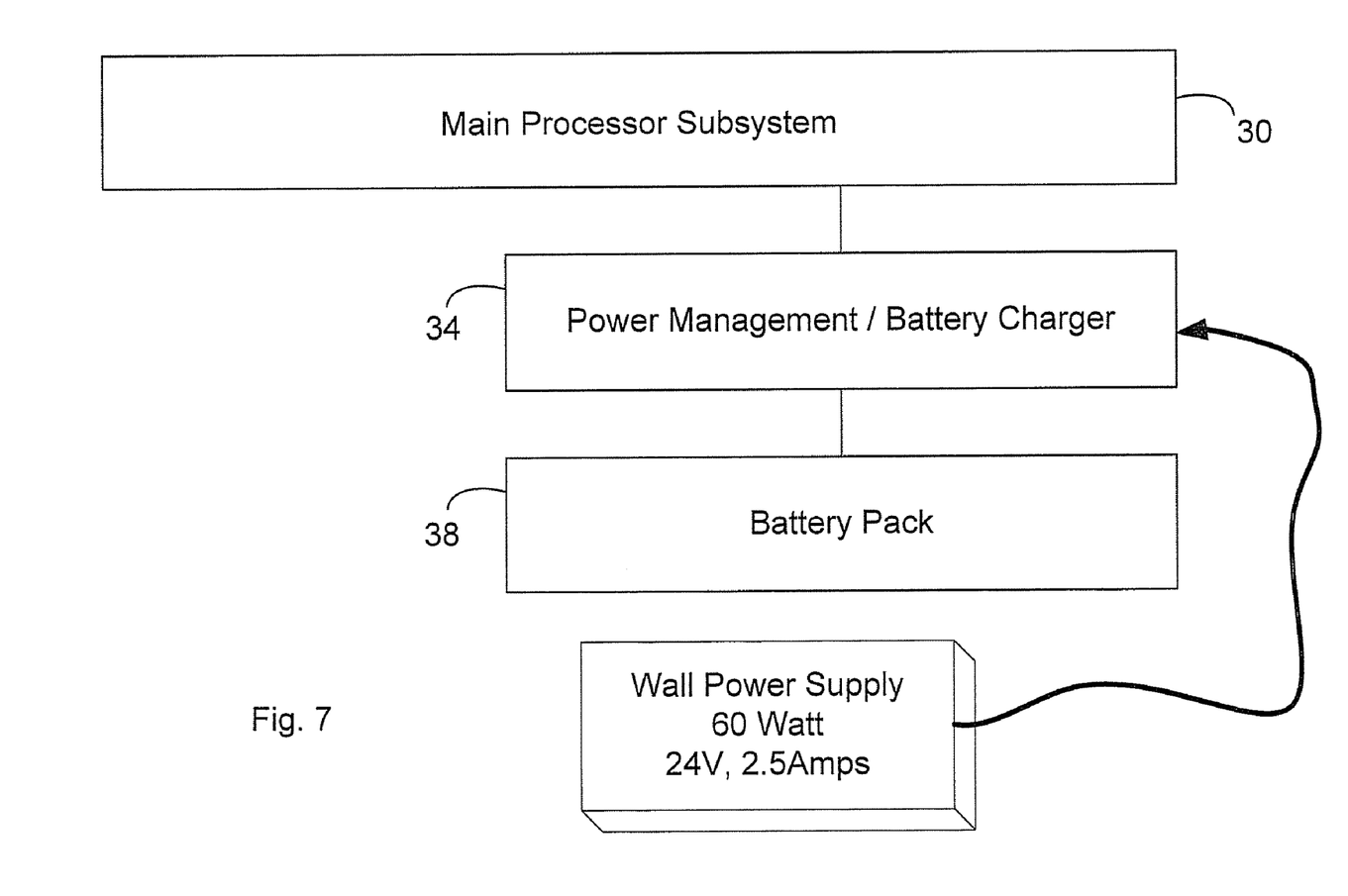
FIG. 7 is a block diagram of an example of a power management arrangement for a Master Antenna Controller according to one example of the present invention.

Referring to FIGS. 6 and 7, an example of the power management subsystem 34 is provided. The power management subsystem 34 provides an interface between the battery pack 38, the wall power supply (not shown), and the main processor subsystem 30. The power management board accepts, in one example, 24 volts input from a wall power supply. The main functions of the Power Management, Battery Charger board include: accepting input for a wall type power supply for the purposes of charging the battery pack while the unit is in operation; battery pack charging; establishing a communications path from the smart battery pack's fuel gauge to the main processor board, and distributing three voltages to the main processor subsystem 30, 24 Volts, 5.0 Volts, and 3.3 Volts.

The battery pack 38 supplies power to the RET Master 10 circuitry, and preferably includes a thermal fuse, and a current limiting fuse. The battery pack 38 may be packaged in a shrink wrap enclosure with wire leads and a connector for plugging into the power management/battery charger subsystem 34. Preferably, the battery pack 38 supports a load of 24 watts for 5 minutes, and 5 watts for 115 minutes, without needing to be charged. In one example, the battery pack 38 comprises 8 NiMH cells producing a 9.6 volt output. 4/3A cells may be used. Preferably, the battery pack 38 would provide a run time of approximately two hours. The 8 NiMH cells may be shrink wrapped together, with a connector for voltage, ground, and battery temperature.

The wall power supply may be any suitable supply. In one example, the wall type power supply is an off the shelf, 60 watt, 24 volts DC out power supply.

The RET Master 10 is configured through hardware and software to include the following features\functionality:
  AISG line device communication, configuration, scanning, programming and upgrading.
  Simple yet intuitive UI to help user navigate between the various features.
  History workflow for task at the site (includes image acquisition and storage).
  Diagnostic for monitoring voltage and current reading on the AISG line.
  Ability to power off the AISG line without disconnecting the AISG connection.

In one example, an appropriate software architecture may include a layer design approach. A layer design approach will provide decoupling between the various library components as well as hide and abstract details of a component for the calling application. An example of this is shown in the rendering interface driver that can support OpenGL or DirectX. To ensure robustness and flexibility for the software to change based on priorities and requirements, each layer component may provide a clear set of APIs that require minimal changes to existing interface but provide the ability to add new interfaces if necessary.

In one example, the software for the RET Master 10 includes the following software dependencies:
  BSP clone of iMX31.
  Display device drivers supporting resolution of 800×480×24.
  Camera drivers supporting camera configuration and programming.
  Touchscreen driver supporting i2c communication.
  Serial drivers supporting RS-232.
  Generic WinCE USB drivers.
  MFC runtime dlls.
  OpenGL ES dlls.

Generally, a RET Master application 110 includes certain system components. These system components may include a Core Runtime Library, an AISG stack framework, a Camera Library, a GPS Library a Geometry Renderer, an Open GL Renderer and an Application Layer.

The Core Runtime library comprises an underlying library module having a set of API classes supporting Unicode, logging, memory tracking and diagnostic, memory management, etc.

The AISG Stack framework includes Layer 2 and Layer 7 classes providing the AISG protocol for AISG line devices. This library also provides a workflow for AISG messaging.

The Camera Communications Library is a library component that communicates with an image sensor, such as an Aptina image sensor. It exposes public classes that expose the hard independent functionality to a calling application. As noted above, the camera function is optional.

The GPS Communications Library is a library component that communicates with the GPS receiver through serial I/O. This component will expose a set of class APIs that is independent of the GPS receiver. Internally, it will use the standard NMEA (such as NMEA 0183) to gather GPS communication. The processor may acquire location information from the GPS through this interface.

The Geometry Renderer is a rendering engine that provides material system, object entity hierarchy, scene graph rendering, interface into directx\opengl rendering API. The OpenGL Renderer is a driver layer interface provides communication between the GPU and the calling application. In one example, the iMX31 integrated GPU provides the OpenGL ES 1.1 hardware acceleration driver. This particular version limits the use of assembly or HLSL shaders but provides the TnL hardware support.

Figure 8:
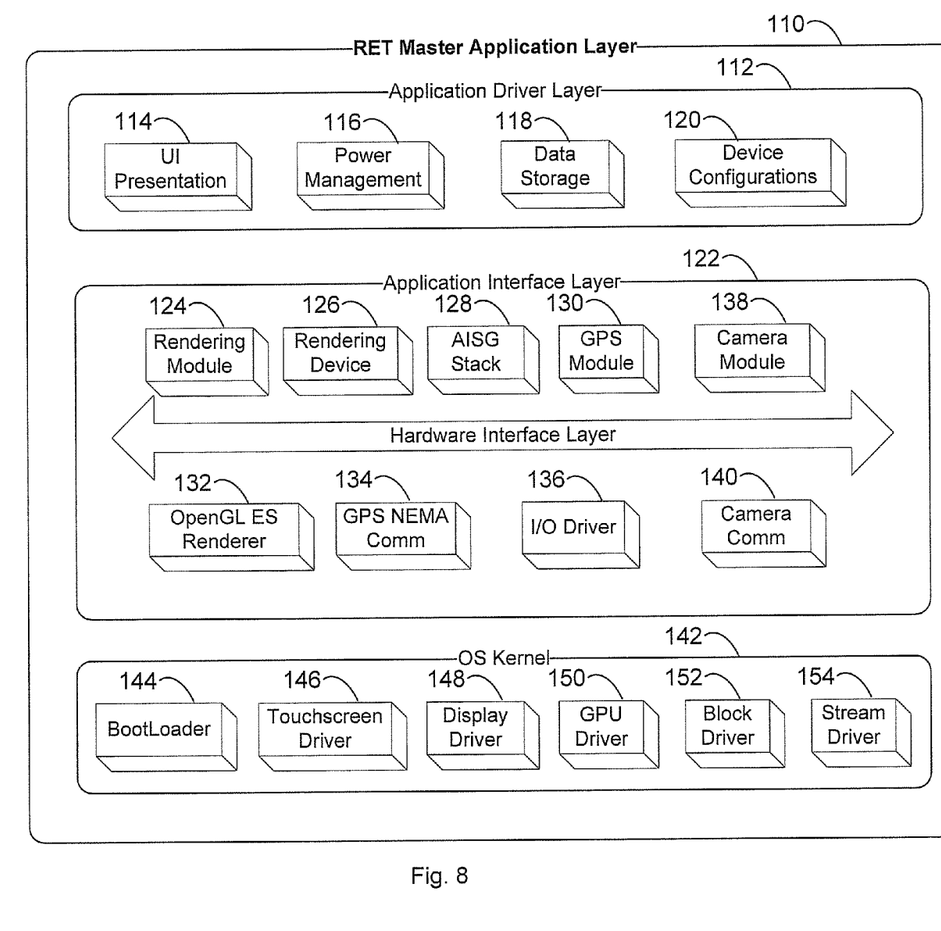
FIG. 8 is a block diagram of an Application for use with a Master Antenna Controller according to one example of the present invention.

In one example, top-level view of the various components and entities that make up the RET Master application 110 is shown in FIG. 8. The Application Driver Layer 112 includes UI Presentation 114, Power Management 116, Data Storage 118, and Device Configurations 120. The Application Interface Layer 122 includes a Rendering Module 124, Rendering Device 126, AISG Stack 128, GPS Module 130, OpenGL ES Renderer 132, GPS NMEA Comm 134, and I/O Driver 136. Optionally, as shown, the Application Interface Layer 122 further includes may also include a Camera Module 138 and Camera Communication module 140. The OS Kernel 142 may include a Bootloader 144, Touchscreen Driver 146, Display Driver 148, GPU Driver 150, Block Driver 152, and Stream Driver 154.

Figure 9:
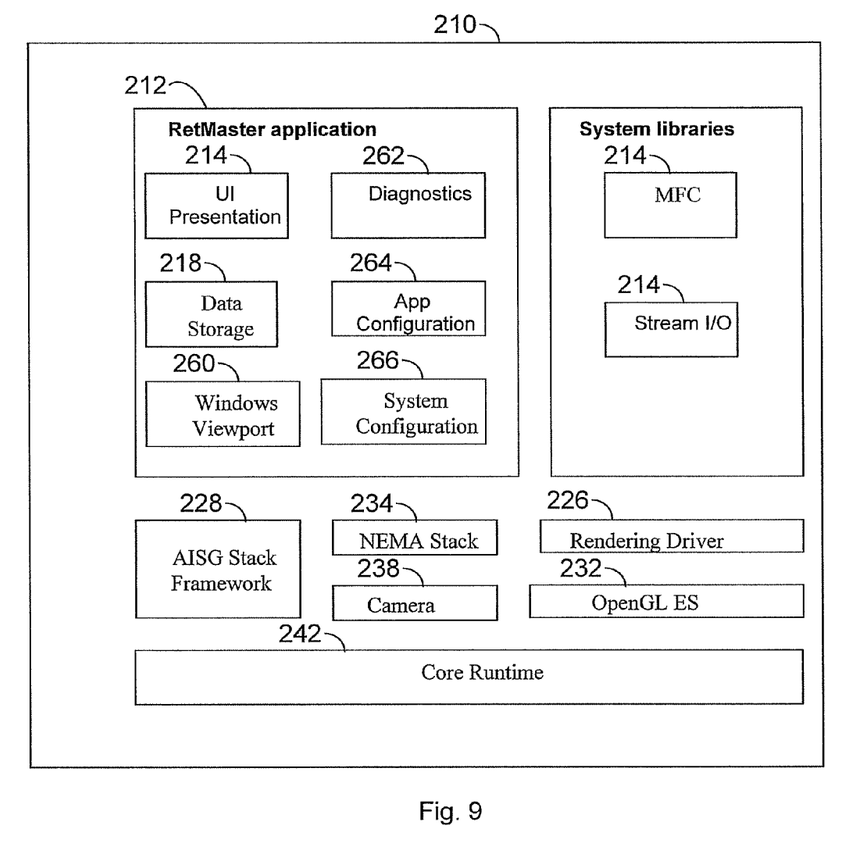
FIG. 9 is another block diagram of an Application for use with a Master Antenna Controller according to one example of the present invention.

In another example, illustrated in FIG. 9, an RET Master application 210 includes the following Application Layer 212 components: UI Presentation 214, Data Storage 218, Windows Viewport 260, Diagnostics 262, App Configuration 264, and System Configuration 266. Additional system libraries include MFC 268 and Stream I/O 254. In this example, the application interface layer may include the AISG Stack Framework 228, NMEA Stack 234, Camera 238, Rendering Driver 226, and OpenGL ES 232. These entities interact with the Core Runtime environment (e.g., the OS Kernel layer 142).

Figure 10:
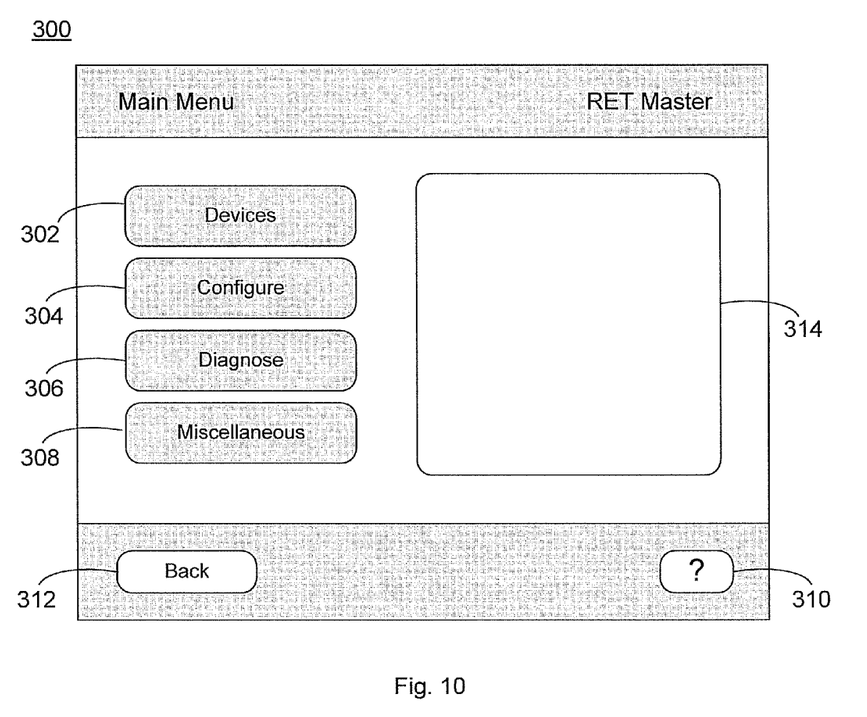
FIG. 10 is an exemplary screen shot of an Application for use with a Master Antenna Controller according to one example of the present invention.

The RET Master Application Layer includes a User Interface ("UI") system that will allow the user to navigate between the various components. For example, FIG. 10 illustrates one example of a "main menu" screen shot 300 of the display 12. The main menu provides virtual buttons for selecting activities. The buttons include Devices 302, Configure 304, Diagnose 306 and Miscellaneous 308. Also included are buttons for help ("?") 310 and Back 312. An image area 314 may be used to display an image, such as a photograph of the installation being serviced.

Figure 11:
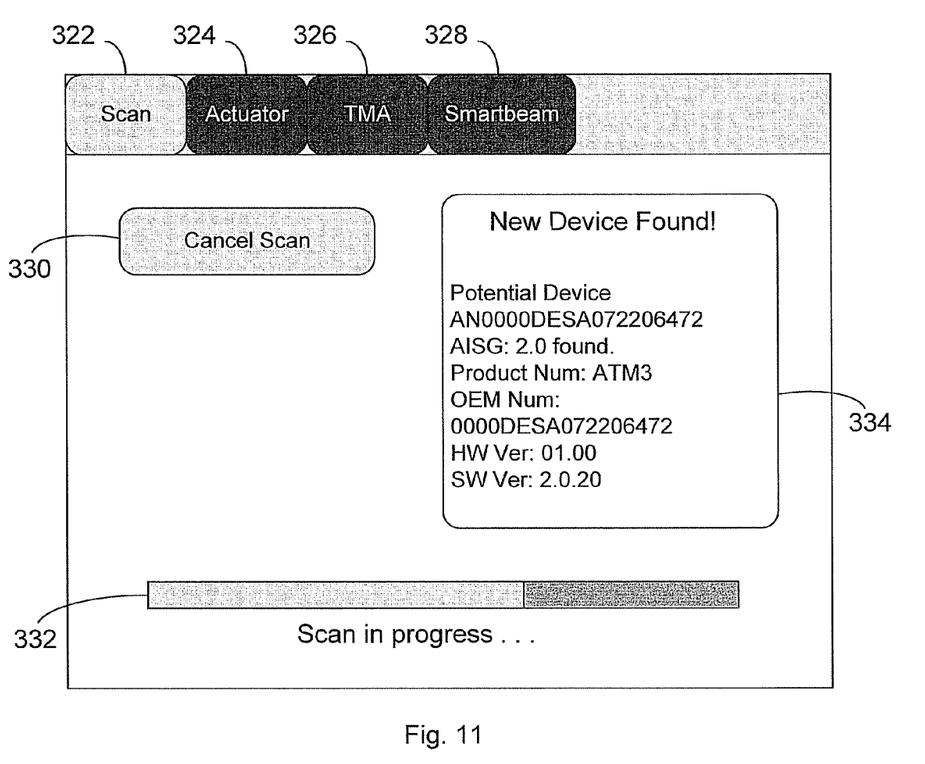
FIG. 11 is another exemplary screen shot of an Application for use with a Master Antenna Controller according to one example of the present invention.

FIG. 11 illustrates one example of a scan process screen 320. Scan process screen 320 includes virtual buttons for Scan 322, Actuator 324, TMA 326, and Smartbeam 328. The scan process screen 320 also includes a Cancel Scan 330 button and a scan progress bar 332. The processor 50 acquires information from devices found during the scan. Information window 334 displays information regarding the devices found during the scan.

The application is also responsible for loading the interface drivers for the camera, GPS, renderer, AISG stack, etc. RET Master 10 is the main entry point for the user and, in one example, is the only application accessible by a field technician on the device. The file system, utilities and system applications are not typically directly accessible.

In use, one function of the RET Master 10 is to serve as a controller for RET antennas. Typically, the RET Master 10 is connected to a bus via the AISG connectors 24 and/or 26. The RET Master Application 110 presents graphical representations of antenna control commands via the user interface and receives selected commands in the user interface. In one example, as illustrated in FIG. 11, the RET Master 10 is configured to display a screen from which a user may select a "scan" button. The RET Master 10 application starts a scan process and opens scan communication onto the bus. When an actuator is found, additional information is queried on the device. The RET Master 10 registers the device onto its device list and propagates the information to the UI thread. The User Interface system updates the device UI list with the newly added device. As illustrated in FIG. 11, the information may be displayed in information window 334. The scan process may periodically update itself.

The RET Master 10 may also be configured to control non-AISG actuators. In this example, a user selects a non-configured actuator. The user selects on the button "Edit Selected" which will bring up the "Edit Selected" dialog for the actuator. The user may then select an antenna model from an Antenna Model selection menu. The user selects a "Commit" button. RET Master application 110 looks up the information for the selected antenna model and configures the selected actuator. The RET Master application 110 then updates the "model" UI element with the configure antenna model for the actuator.

To activate a tilt actuator, in one example, from the device screen, the user selects the actuator to tilt. The user clicks on the "Move Selected" button. The RET Master application 110 launches the "Move Selected" form. The user provides a tilt value in the tilt UI element. The user clicks on the "Commit" button. The RET Master application 110 disables all UI-enabled elements on the "Move Selected" form. The RET Master application 110 sends the command to tilt the actuator. The RET Master application 110 updates the current tilt value for the actuator. The Ret Master application 110 enables the UI-enabled elements on the "Move Selected" form. Other movements of the RET antenna (e.g., Pan) may be controlled in a similar manner.

Figure 12:
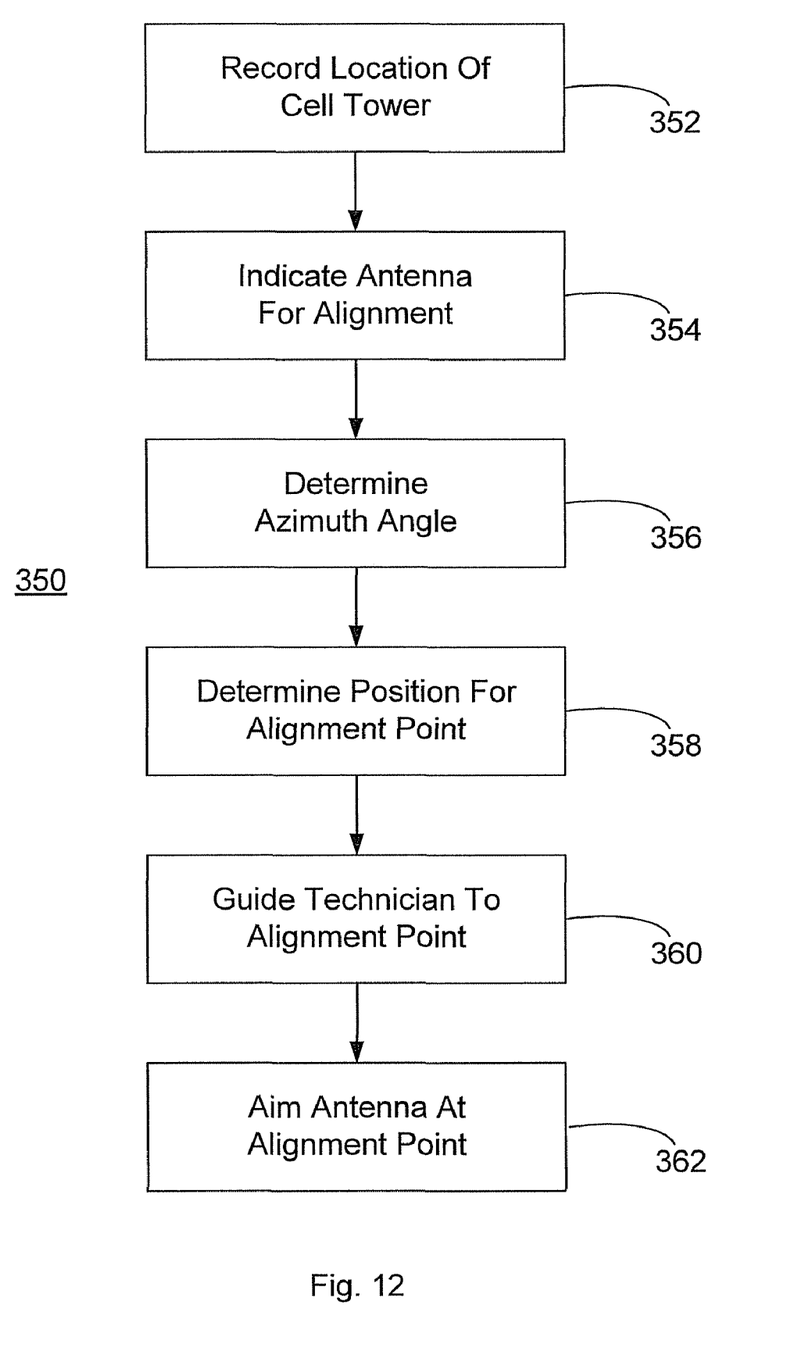
FIG. 12 is a flow chart of one example of a method of aligning an antenna using a Master Antenna Controller according to one example of the invention.

The RET Master 10 may also be used according to alignment process 350, illustrated in FIG. 12. A first technician may record a location of a cellular antenna tower (step 352) using the GPS functionality of the RET Master 10. Through inputs made via the touch screen or other input means on the RET Master 10, the technician may then indicate which of the antennas on the tower requires alignment (step 354). The RET Master 10 then determines the desired azimuth angle (step 356) for the selected antenna from information provided by the wireless operator. Alternatively, the step of determining the described azimuth angle (step 356) may be performed by the technician who may then enter a desired azimuth angle. The RET Master 10 then provides alignment information. The RET master 10 determines a location for the technician to position him or herself to serve as an alignment point (step 358). The alignment point is chosen such that, when the selected antenna is aimed at the alignment point, the desired azimuth angle is achieved. The RET Master 10 then guides the technician to the alignment point (step 360). In one example, the RET Master 10 may display a heading to walk (graphically, with an arrow if so desired) and a distance to walk from the tower base. The RET Master 10 receives updated location information from the GPS as the technician moves toward the alignment point. In one example, when the first technician holding the RET Master 10 has reached the alignment point, the RET Master 10 indicates to the first technician to stop. In the final step, a second technician on the tower may align the antenna by pointing the antenna at the first technician standing at the alignment point (step 362). This technique avoids the known disadvantages of tower-induced magnetic compass deviation and hauling cumbersome, expensive alignment tools aloft.

The RET Master may include a Close-Out-Package Wizard, which will allow technician crews to create standardized close out packages with a few clicks. The close-out package is a predefined report documenting that the antennas in an associated cell tower are installed and operating according to the requirements of a wireless operator. The Close-Out Package Wizard significantly reduces the time required of the technicians to prepare the close out packages. Also, the wizard provides a standardized close out package format to ensure that the same format is used by all technician crews.

What is claimed is:

1. A hand-held antenna controller comprising:
   a processor;
   an AISG-compliant interface, coupled to the processor, the AISG-compliant interface enabling communication with a plurality of actuators associated with RET antennas;
   a user interface, coupled to the processor; and
   a GPS receiver, coupled to the processor;
   wherein the processor is configured to conduct control and diagnostic functions of the RET antennas via the AISG-compliant interface and to consolidate information from the actuators associated with RET antennas via the AISG-compliant interface, the user interface, and the GPS receiver into a predefined report.

2. The antenna controller of claim 1, further comprising a camera.

3. The antenna controller of claim 1, wherein the user interface comprises a touch-sensitive display.

4. The antenna controller of claim 1, wherein the processor is further configured to:
   acquire location information from the GPS receiver;
   acquire antenna configuration information; and
   provide antenna alignment information.

5. The antenna controller of claim 4, wherein the alignment information comprises a location for an alignment point.

6. The antenna controller of claim 4, wherein the antenna configuration information comprises a desired azimuth angle.

7. The antenna controller of claim 1, further comprising an AISG voltage and current diagnostic circuit coupled to the AISG compliant interface and to the processor.

8. The antenna controller of claim 1, further comprising a storage memory coupled to the processor.

9. The antenna controller of claim 1, wherein the processor is further configured to control antenna attributes comprising pan and tilt functions of individual antennas via the AISG-compliant interface.

10. The antenna controller of claim 1, wherein the processor is configured to present graphical representations of antenna control commands via the user interface and to receive selected commands via the user interface.

11. A hand-held antenna controller comprising:
    a processor;
    an AISG-compliant interface, coupled to the processor, the AISG-compliant interface enabling communication with a plurality of devices on an AISG bus;
    a user interface, coupled to the processor; and
    a GPS receiver, coupled to the processor;
    wherein the processor is configured to: scan for the presence of devices on the AISG bus, acquire location information from the GPS receiver; receive an indication of an antenna to be aligned; control the indicated antenna via a detected device on the AISG bus; determine a desired azimuth angle for the indicated antenna; and determine a location for an alignment point for the indicated antenna.

12. The antenna controller of claim 11, wherein the alignment point comprises a location toward which the indicated antenna should be aimed.

13. The antenna controller of claim 11, wherein the processor is configured to determine the desired azimuth angle from information provided by a wireless operator.

14. The antenna controller of claim 11, wherein the processor is configured to determine the desired azimuth angle from information provided through the user interface.

15. The antenna controller of claim 11, further comprising an AISG voltage and current diagnostic circuit coupled to the processor.

16. The antenna controller of claim 11, wherein the processor is further configured to control antenna attributes comprising pan and tilt functions of individual antennas via the AISG-compliant interface.

17. The antenna controller of claim 11, wherein the processor is configured to present graphical representations of antenna control commands via the user interface and to receive selected commands via the user interface.

18. The hand-held controller of claim 11, wherein the processor is configured to scan for the presence of at least one of: RET actuators and tower mounted amplifiers.

19. A method of aligning an antenna using an antenna controller, comprising:
    determining and recording a location of a cell tower;
    indicating an antenna for alignment;
    determining azimuth angle for the indicated antenna;
    determining a location for an alignment point to achieve the desired azimuth angle;
    providing a heading and distance to move the antenna controller to the location of the alignment point; and
    aiming the indicated antenna at the antenna controller located at the alignment point.

20. A method aligning an antenna using an antenna controller, comprising:
    connecting the antenna controller to an AISG bus at a cell tower;
    conducting physical layer electrical diagnostics on the AISG bus;
    scanning for devices associated with RET antennas on the AISG bus;
    selecting a device to control;
    editing a configuration of the RET antenna associated with the selected device;
    determining and recording a location of the cell tower; and
    creating a close-out package that includes the location of the cell tower, the diagnostics of the AISG bus, and the configuration of the RET antenna.

* * * * *